Aug. 17, 1965     D. W. RICHARDSON     3,201,546
POWER CONTROLLING DEVICE FOR ELECTRICAL HEATING ELEMENTS
Filed July 24, 1961     2 Sheets-Sheet 1

*Inventor*
DOUGLAS WILLIAM RICHARDSON by: *Cavanagh & Norman*

Aug. 17, 1965  D. W. RICHARDSON  3,201,546
POWER CONTROLLING DEVICE FOR ELECTRICAL HEATING ELEMENTS
Filed July 24, 1961  2 Sheets-Sheet 2

Inventor
DOUGLAS WILLIAM RICHARDSON by: Cavanagh & Norman

3,201,546
POWER CONTROLLING DEVICE FOR ELECTRICAL HEATING ELEMENTS

Douglas William Richardson, Aurora, Ontario, Canada, assignor to Hart Manufacturing (Canada) Limited, Aurora, Ontario, Canada
Filed July 24, 1961, Ser. No. 126,173
1 Claim. (Cl. 200—113)

This invention relates to an infinitely variable electrical power controller for regulating the rate of electrical power supplied to an external device.

In order to overcome the disadvantages of step-type switches, used for controlling surface elements on cooking ranges and the like, several types of power controlling switches have been devised. Various arrangements of bi-metal strips, spring-loaded toggles, and heaters have been used in attempting to provide an infinitely variable controller. One disadvantage with prior controllers is the substantial complexity of design as well as increased bulk of the switch. Furthermore, the linkages normally required lead to faulty action due to wear.

Accordingly, it is an object of the present invention to provide a power controller which incorporates the operable elements into one unit.

It is a further object of this invention to provide a power controller having an infinite number of operable positions.

It is a further object of this invention to provide a power controller having an adjustable operating range.

It is a further object of this invention to provide a power controller having a variable duty cycle.

It is a still further object of this invention to provide a power controller having automatic compensation for ambient temperature differences.

These and other objects and features of this invention will become apparent when taken into consideration with the following detailed description and accompanying drawings of a presently preferred embodiment.

Figure 1:
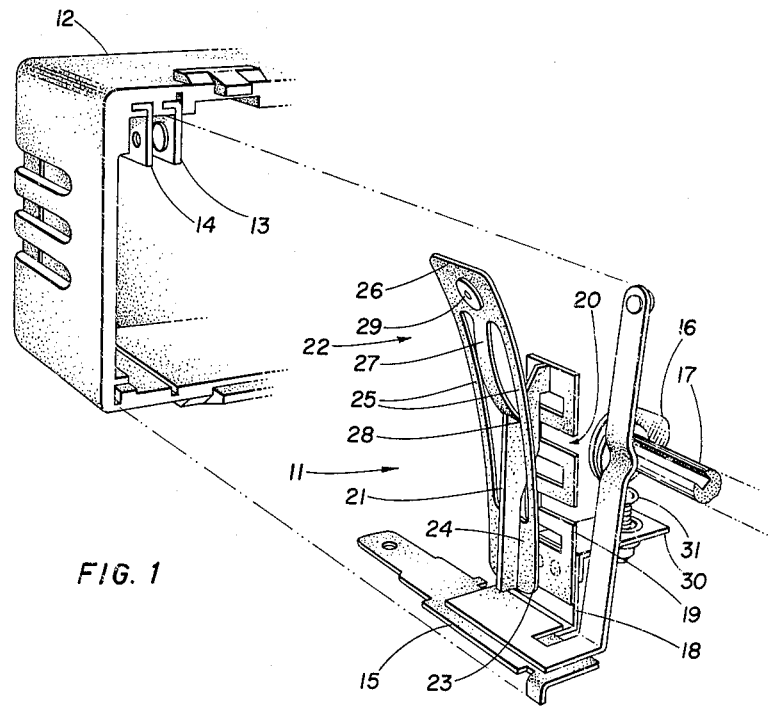
FIGURE 1 is a perspective view of the controller.

Referring to FIGURE 1, the controller designated generally at 11, comprises a housing 12, supporting in fixed relationship, electrical contact 13, switch stop 14, and controller mounting 15. A cam 16 is rotatably operable by shaft 17 projecting through housing 12 and in communication with a knob (not shown).

Mounting 15 supports a flat spring 18 rigidly secured thereto. A bi-metal element 19 has one end rigidly secured to spring 18 and has a substantially rectangular configuration. A plurality of slots 20 are formed from each side of bi-metal element 19 in an alternate manner substantially toward the opposite side, whereby a confined flowpath is provided for electrical current flowing therethrough. Upon a change in temperature, bi-metal element 19 deforms in line with the longitudinal axis.

Secured to the free end of bi-metal element 19 is a switch mounting 21 extending in spaced apart relationship substantially toward the fixed end thereof. Mounting 21 supports a switch member designated generally as 22 having a generally rectangular open configuration. A transverse member 23 is rigidly secured to the free end of mounting 21 at a position 24 and supports at the extremities thereof a pair of side members 25 extending from transverse member 23 to a position substantially beyond the fixed end of mounting 21. Side members 25 terminate in a transverse contact member 26 which supports thereat, between side members 25, a spring member 27 the free end of which is resiliently biased toward contact member 26, spring member 27 being pivotally held by a V-shaped cutout 28 in mounting 21.

Contact member 26 supports an electrical contact 29 in a position substantially between contact 13 and switch stop 14. From the foregoing it will be evident that upon contacts 29 and 13 being closed, an electrical flowpath is provided from mounting 15, through spring 18, bi-metal element 19, mounting 21, switch member 22, and contacts 29 and 13.

A bi-metal compensator 30 is rigidly secured to spring 18 and has a threadably adjustable cam rider 31 mounted thereon in position to bear upon cam 16. Upon rotation of cam 16, compensator 30 will be displaced thus biasing spring 18 and elements secured thereto.

Figure 2:
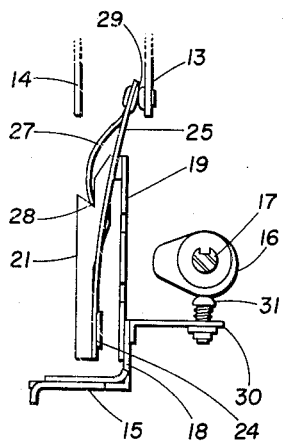
FIGURE 2 is a plan view of the operable elements of the controller in the power on position.

With reference to FIGURE 2 the controller is shown in the power on position prior to any noticeable distortion of bi-metal element 19 due to current flow. Cam rider 31, bearing on cam 16, prevents deflection of spring 18 and thus positions bi-metal element 19. The action of spring member 27 is to force contact 29 in pressural engagement with contact 13. Upon current flowing through the controller, bi-metal element 19 is heated causing deflection, thereby moving position 28 closer to a line joining position 24 and the face of contact 29.

Figure 3:
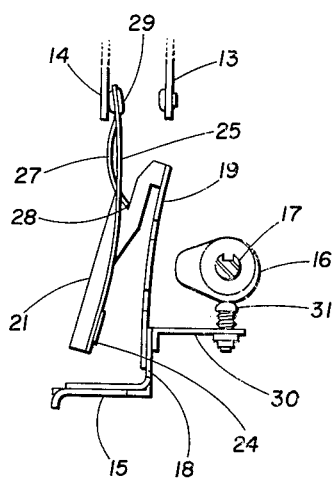
FIGURE 3 is a plan view of the controller in the power off position.

Electrical contact is maintained, and thus heating and the resulting deflection continued, until position 28 passes the line joining position 24 and contact 29 and the force of spring member 27 is directed away from contact 13. The resulting switch position is as shown in FIGURE 3, wherein contact 29 is pressurably biased against stop 14, bi-metal element 19 is at maximum deflection, and electrical contact is broken. Upon cooling, bi-metal element 19 returns to the position as shown in FIGURE 2, the switch recontacting upon position 28 passing the line joining position 24 and contact 29.

Figure 4:
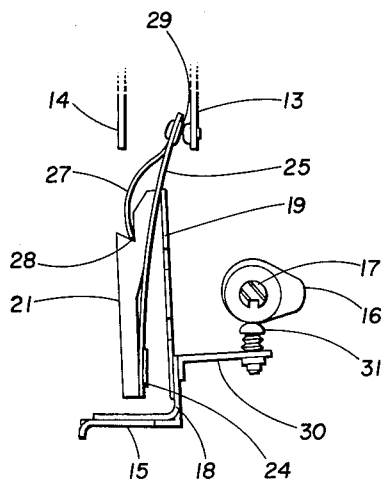
FIGURE 4 is a plan view of the controller shown set at an increased power range in the power on position; and, FIGURE 5 is a graph illustrating the power control feature of the controller.

Referring to FIGURE 4 the controller is shown in the power on position with cam 16 set to an increased power position. Spring 18, biasing cam rider 31 in contact with cam 16, places position 28 at a greater distance from a line joining position 24 and contact 29, whereby an increased temperature range is required to deflect bi-metal element 19 to operate the switch.

As the ambient temperature about controller 11 increases bi-metal compensator deflects tending to cause cam rider 31 to move away from cam 16. Spring 18, biasing cam rider 31 in contact with cam 16, is thereby allowed to deflect and cause a displacement of bi-metal element 19, thus compensating for deflection of bi-metal element 19 due to the increased ambient temperature. A decrease in ambient temperature is evidently, similarly compensated for.

Figure 5:
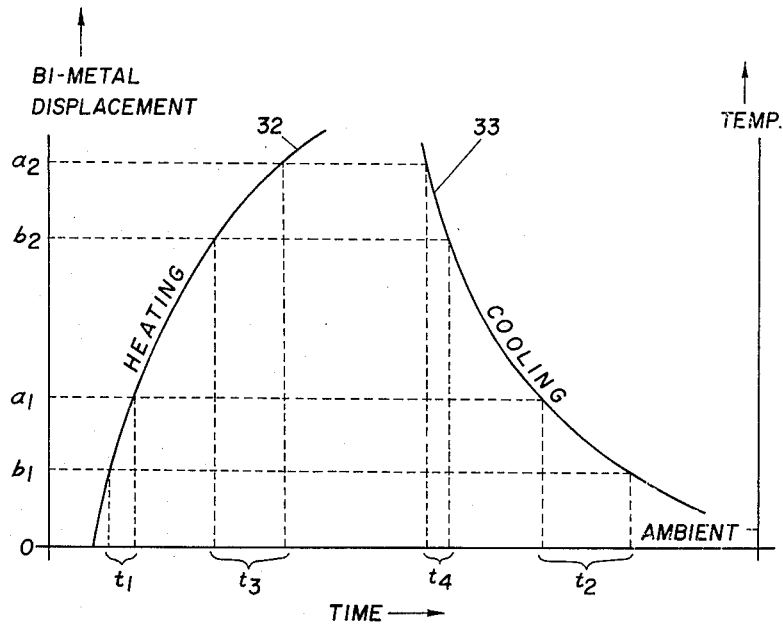

Referring to FIGURE 5 a graph of the method of controlling power is shown illustrating the variation of power input according to the various cam settings. The abscissa denotes time while the ordinate denotes temperature or bi-metal element 19 displacement. Curve 32, representing the heating range of bi-metal element 19, is parabolic increasing in magnitude positively and curve 33, representing the cooling rate of bi-metallic element 19, is parabolic decreasing in magnitude positively.

Curve 32 represents also the power on time of the controller, whereas curve 33 represents the power off time. Considering a certain temperature of bi-metal displacement range, such as $b_1$ to $a_1$ as shown in FIGURE 5, verticals drawn from the points of intersection of the values $a_1$ and $b_1$ on curve 32 will define a time $t_1$ during which the controller is in the power on position. Similarly, verticals drawn from the points of intersection of the values $a_1$ and $b_1$ on curve 33 will define a time $t_2$ during which the controller is in the power off position.

Considering now a higher temperature of bi-metal displacement range, such as $b_2$ to $a_2$, the time $t_3$ will define the power on portion of the controller cycle and $t_4$ will define the power off portion of the cycle. It is evident that, since the curves 32 and 33 are substantially parabolic, the higher the temperature range of operation of the controller the greater the portion of power on and the lesser the portion of power off for each cycle.

From the foregoing it will be evident that the invention comprises a bi-metallic element resiliently secured to an electrical contact and having rigidly secured to the bi-metallic element a spring actuated switch. An electrical contact and a switch stop are positioned to limit the movement of the switch and an adjustment device is positioned to alter the bias of the spring on the switch.

It is understood that the embodiment of the invention, as herein described, is to be taken as a presently preferred example of the invention, and that various changes in form or design may be resorted to while still maintaining the spirit of the invention, and falling within the scope of the appended claim.

What I claim is:

A power controlling switch structure for electric cooking stoves and the like and comprising: a base; a cantilever-like spring rigidly mounted at one end on said base; a current conducting bimetal fastened substantially to the other end of said spring and extending in further cantilevered manner therefrom; a heat conducting compensating bimetal fastened at one end thereof to said spring substantially with said current conducting bimetal; manually adjustable cam means engageable with the other end of said compensating bimetal for adjusting the position thereof and the free end of said spring and said current conducting bimetal to a predetermined position sensitive to the heat in said compensating bimetal conducted thereto by the current conducting bimetal due to the passage of electrical current therethrough; a snap action contact arm structure rigidly mounted on the other end of said current conducting bimetal and having a contact member thereon moveable from one snap position to another snap position; a housing structure rigidly mounting said base; a switch contact in said housing engageable by the contact member of said snap action contact structure; and a switch stop in said housing spaced a predetermined distance from the switch contact therein for effecting snap action of said snap action structure according to manual adjustment of said cam means and the heat developed by electrical current passing through said current conducting bimetal from said base to said snap action structure, the switch contact thereon and the switch contact of said housing.

References Cited by the Examiner

UNITED STATES PATENTS

| | | | |
|---|---|---|---|
| 1,675,370 | 7/28 | Miller | 200—138 |
| 2,284,383 | 5/42 | Elmer | 200—113 |
| 2,597,759 | 5/52 | Starkey | 200—113 |
| 2,980,779 | 4/61 | Hickle et al. | 200—113 |
| 3,015,015 | 12/61 | Wirma | 200—67 |
| 3,078,361 | 2/63 | Mason et al. | 200—122 |
| 3,113,194 | 12/63 | Van Boort et al. | 200—122 |

BERNARD A. GILHEANY, *Primary Examiner.*
ROBERT K. SCHAEFER, *Examiner.*